July 3, 1973 I. S. SHAH 3,743,483
CRYSTALLIZATION OF NaCl FROM MgCl₂ SOLUTION
Filed May 28, 1971
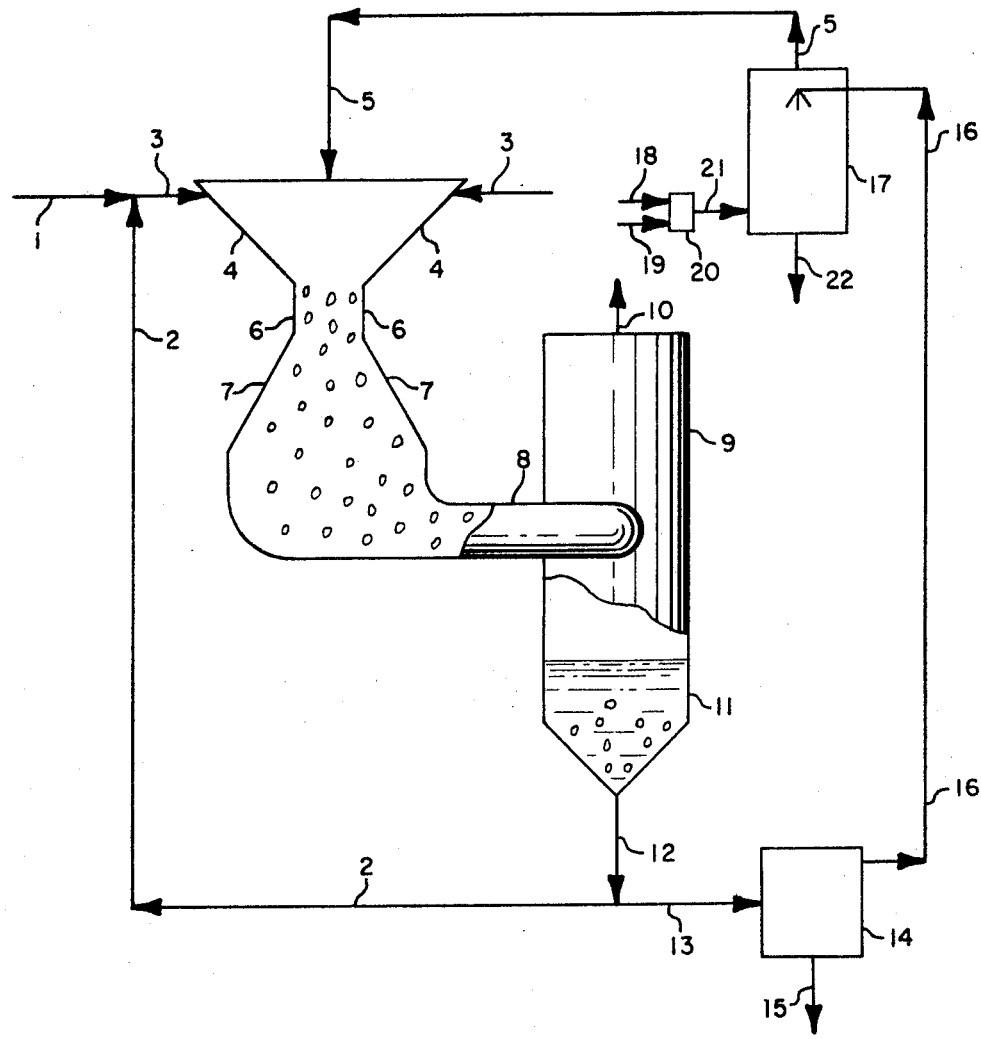
INDRAVADAN S. SHAH
INVENTOR.
BY J. J. Chaborty
AGENT United States Patent Office 3,743,483
Patented July 3, 1973

3,743,483
CRYSTALLIZATION OF NaCl FROM MgCl$_2$ SOLUTION
Indravadan S. Shah, Forest Hills, N.Y., assignor to Chemical Construction, New York, N.Y.
Filed May 28, 1971, Ser. No. 148,056
Int. Cl. C01d 1/30
U.S. Cl. 23—303            9 Claims

ABSTRACT OF THE DISCLOSURE

An aqueous brine containing dissolved sodium chloride and magnesium chloride is concentrated to produce selective crystallization of sodium chloride in a magnesium chloride-rich concentrated brine, by passing the aqueous brine through a venturi contactor for evaporation of water by direct contact with a high velocity hot gas stream.

BACKGROUND OF THE INVENTION

Field of the invention.—The invention relates to the concentration and selective crystallization of aqueous brines containing saline chloride compounds including sodium chloride and magnesium chloride, such as are found or produced from deposited beds or domes of mixed salts or in natural saline lakes found in arid regions.

Description of the prior art.—The art of crystallizing saline brines has been extensively developed, because of the abundance and availability of such brines in many regions. Among the many disclosures relative to this art are U.S. Pats. Nos. 3,402,753; 3,365,278; 3,361,648; 3,361,647; 3,195,614; 2,532,924; 2,479,001; 1,900,247; 1,878,586; 1,875,354; 1,873,251; 1,863,751; 1,627,068; 1,598,935; 1,593,038; 1,549,018; 1,273,208 and 1,156,388. Recent improvements relative to the recovery of magnesium chloride from mixed salt solutions are described in U.S. Pat. No. 3,516,785 and Canadian Pat. No. 843,337. A venturi configuration in a heating, evaporating and concentrating apparatus is shown in U.S. Pat. No. 3,275,062 and in Chemical Engineering, issue of Aug. 26, 1968, pages 54 and 56.

SUMMARY OF THE INVENTION

In the present invention, an aqueous saline brine principally containing dissolved sodium chloride and magnesium chloride is effectively concentrated in a novel manner, so as to selectively precipitate solid crystals principally composed of sodium chloride in a concentrated brine principally containing dissolved magnesium chloride. The aqueous brine is concentrated by direct contact with a hot drying gas in a venturi contactor, which accelerates the hot gas stream to high velocity prior to projection of the aqueous brine into the hot gas at the throat section of the venturi passage. The aqueous brine is effectively dispersed into the hot gas in the form of a plurality of discrete droplets, and rapid evaporation of water from the droplets into the hot gas and gas-liquid equilibrium are attained, with concomitant formation of solid cyrstals of desirable characteristics, including high sodium chloride content and a sand-like consistency. The solid crystals are readily settled or filtered from the residual concentrated brine, which is now rich in magnesium chloride and which may be passed to an electrolytic cell facility for the production of magnesium and chlorine.

The principal advantage of the invention is that rapid and complete gas-liquid equilibrium is attained in the venturi contactor, with close temperature approach between the gaseous and liquid phases. Another advantage is that deposition of solid crystals on the apparatus during concentration, in the form of layers, scale or crusts, is effectively prevented. A further advantage is that separation of a major proportion or essentially all of the sodium chloride from the magnesium chloride is attained by selective crystallization. An additional advantage is that the solid crystals which are formed in the venturi contactor and its appurtenances are of a granular sand-like consistency, and these crystals are readily settled or filtered from the concentrated magnesium chloride-rich brine formed in the system.

It is an object of the present invention to provide an improved method for the concentration of an aqueous saline brine containing sodium chloride and magnesium chloride, so as to selectively crystallize solid crystals of sodium chloride from a concentrated magnesium chloride-rich brine.

Another object is to process an aqueous brine containing sodium chloride and magnesium chloride to separate the sodium chloride from a magnesium chloride-rich brine.

A further object is to selectively crystallize solid crystals of sodium chloride of improved physical characteristics from a mixed sodium-magnesium chloride brine.

An additional object is to provide an improved method for contacting a saline brine containing sodium and magnesium chlorides with a hot drying gas.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the method of the invention is presented. Brine stream 1, typically derived from an ore or saline lake as mentioned supra, generally contains dissolved magnesium chloride and sodium chloride, together with minor amounts of other salts such as potassium chloride, calcium chloride and calcium sulfate, and stream 1 typically contains in the range of about 5% to 15% dissolved magnesium chloride content by weight and in the range of about 5% to 20% dissolved sodium chloride content by weight. Stream 1 is preferably combined with the recycle concentrated slurry stream 2 to form stream 3 which is passed downwards on the inner wall or surface of the converging section 4 of the venturi passage contactor. Section 4 is generally in the form of an inverted frusto-conical baffle.

A hot drying gas stream 5 is also passed downwards through converging passage 4. Stream 5 is typically at an initial temperature in the range of 150° C. to 400° C., and as will appear infra stream 5 is preferably produced by burning a fluid hydrocarbon fuel with air. Stream 5 is accelerated to high velocity while flowing downwards through converging passage 4, and stream 3 is projected into the high velocity gas stream at the throat section of the venturi passage defined by the cylindrical baffle 6 which depends from baffle 4. A rapid and complete gas-liquid equilibrium is attained in section 6, due to dispersion of the liquid stream into a plurality of discrete droplets within the throat section 6, and concomitant rapid evaporation of water vapor into the gaseous phase is produced, with resultant selective formation of sodium chloride-rich crystals of a sand-like consistency.

The resultant gas-liquid mixture discharged downwards from section 6 is generally at an equilibrium reduced temperature typically in the range of 60° C. to 95° C., and the gas-liquid mixture preferably flows into diverging section 7 which is generally in the form of a truncated conical baffle, in order to prevent gas turbulence and thereby reduce gas pressure drop. The gas-liquid mixture next flows from venturi passage section 7 into the transition member 8, which conducts the mixture tangentially into the cyclonic gas-liquid separator 9, which is typically an internally baffled or cyclonic unit for the separation of cooled gas from the concentrated liquid phase containing solid crystals, which is generally in the form of a slurry. The cooled gas, now at a temperature in the range of 60° C. to 95° C. and laden with water vapor, is discharged from unit 9 via stream 10, which may now be passed to atmosphere via a stack or the like.

The separated aqueous slurry collects in the lower section 11 of unit 9, and the concentrated slurry is preferably retained in section 11 for a time interval typically in the range of 1 to 5 minutes, in order to increase the formation of solid crystals rich in sodium chloride and also to increase the dimensions of the crystals by further deposition of sodium chloride on existing crystals. The resultant slurry stream 12 discharged from the bottom of unit 9 now contains a concentrated brine phase rich in magnesium chloride and depleted in sodium chloride content, and a solid crystals phase consisting primarily of sodium chloride. Stream 12 is now preferably divided into stream 2, which is recycled as described supra, and stream 13 which is passed into the filter or centrifuge 14 for the separation of solid crystals from concentrated solution. The solid crystals are removed from unit 14 via stream 15, which contains at least 80% sodium chloride content by weight.

The concentrated aqueous brine removed from unit 14 via stream 16 now typically contains in the range of about 20% to 30% magnesium chloride content by weight, and residual dissolved sodium chloride in an amount less than about 5% by weight. Stream 16 may now be processed in any suitable manner to recover solid magnesium chloride. In this preferred embodiment of the invention, stream 16 is sprayed into the upper end of spray dryer 17, to produce final water evaporation and a solid crystals product. Dryer 17 is provided with a hot gas stream by burning fuel stream 18 with air stream 19 in burner or furnace 20. Stream 18 may consist of any suitable fuel, and stream 18 preferably consists of a fluid hydrocarbon fuel such as natural gas, propane, butane, fuel oil, crude oil, a petroleum refining fraction such as Bunker C residual oil, or the like. The hot gas stream 21 generated by combustion in unit 20 is generally produced at a temperature in the range of 200° C. to 500° C., and stream 21 is passed into unit 17 to produce concentration and crystallization of magnesium chloride by spray drying. The resulting solid crystals formed in unit 17 and principally composed of magnesium chloride are removed via stream 22, which is now passed to product utilization. After final purification, stream 22 may be utilized in an electrolytic cell facility for the production of magnesium and chlorine. The hot off-gas from unit 17 is removed via stream 5, which may contain a minor proportion of dust principally consisting of magnesium chloride. Stream 5 is now utilized as described supra.

Numerous alternatives within the scope of the present invention will occur to those skilled in the art. The ranges of process variables enumerated supra constitute preferred embodiments of the invention for optimum utilization of the process concept. The venturi passage may be horizontally oriented in some instances, in which case streams 3 would be transversely injected into the high velocity hot gas stream at the throat of the venturi passage. In instances when unit 17 is omitted, stream 21 would be directly passed to the venturi passage.

An example of industrial application of the present invention will now be described.

Example

The invention was applied to the concentration and selective crystallization of a saline brine derived from a subterranean geological formation consisting of a bed of crystalline deposit. The saine brine stream 1 was at an initial temperature of 24° C., and feed rate of stream 1 was 1282 tons/day. Stream 5 flow rate was 150,000 s.c.f.m. at 260° C., initial water vapor content was 390 tons/day, dust loading was 14.6 tons/day (90% magnesium chloride). Product brine was produced at 590 tons/day (stream 16), and sodium chloride-rich crystals were produced at 158 tons/day rate. Following are compositions of principal streams.

| Stream number | 1 | 15 | 16 |
|---|---|---|---|
| Percent of component: | | | |
| Magnesium chloride | 11.7 | 2.3 | 25.5 |
| Sodium chloride | 12.4 | 90.9 | 2.9 |
| Potassium chloride | 0.5 | | 1.0 |
| Calcium chloride | 1.9 | 0.3 | 4.1 |
| Calcium sulfate | 0.1 | | 0.1 |
| Water | 73.4 | 6.5 | 66.4 |

The final temperature of the gas-liquid mixture discharged from the venturi passage was 90° C. Temperature approach of outlet gas and outlet slurry was less than 3° C., and the system produced, circulated and discharged slurry product containing about 25% magnesium chloride and less than about 5% sodium chloride (dissolved), and solid crystals of nucleated and suspended sodium chloride, with a minimum of fouling or other operating problems. High dust collection efficiency of 99.2% was measured on a simulated-dust test. Entrainment and carryover from the separator was low, and the separator was provided with a feed brine wall-wash to prevent caking.

I claim:

1. A method for crysallizing solid sodium chloride from an aqueous brine principally containing dissolved sodium chloride and magnesium chloride which comprises generating a hot gas stream at a temperature in the range of 150° C. to 400° C., accelerating said hot gas stream to a high velocity by passing said hot gas stream through a venturi passage, said venturi passage including a converging gas inlet section for gas acceleration and a restricted throat section, projecting a liquid stream comprising said aqueous brine into the high velocity hot gas stream at the throat section of said venturi passage, whereby said aqueous brine is dispersed into said hot gas stream as discrete droplets, water is evaporated from said droplets into said hot gas stream, and solid crystals principally containing sodium chloride are formed within said droplets, separating the mixed gas-droplets stream discharged from said venturi passage at a temperature in the range of 60° C. to 95° C. into a gas stream laden with water vapor and a slurry containing said solid crystals, retaining said slurry for a time interval in the range of 1 to 5 minutes, whereby the formation of solid crystals and the dimensions of said solid crystals are increased, and separating said slurry after said time interval into a concentrated brine phase principally containing dissolved magnesium chloride and a solid crystals phase principally containing sodium chloride.

2. The method of claim 1, in which said hot gas stream is an off-gas discharged from a spray dryer.

3. The method of claim 1, in which said hot gas stream is formed by burning a fuel with air.

4. The method of claim 3, in which said fuel is a fluid hydrocarbon selected from the group consisting of natural gas, propane, butane, fuel oil, crude oil, and residual oil derived from petroleum refining.

5. The method of claim 1, in which said venturi passage is vertically oriented and said hot gas stream is passed downwards through said venturi passage.

6. The method of claim 5, in which said liquid stream comprising aqueous brine is projected into the high velocity hot gas stream by flowing said liquid stream downwards on the inner surface of the converging gas inlet section of said venturi passage, whereby said liquid stream is projected into said hot gas stream within the throat section of said venturi passage.

7. The method of claim 1, in which a portion of said slurry is recycled and added to said aqueous brine to form said liquid stream.

8. The method of claim 1, in which said aqueous brine contains in the range of about 5% to 15% magnesium chloride content and in the range of about 5% to 20% sodium chloride content, said concentrated brine phase contains in the range of about 20% to 30% magnesium chloride content and dissolved sodium chloride in an amount less than about 5%, and said solid crystals phase contains at least 80% sodium chloride content.

9. The method of claim 2, in which said concentrated brine phase is passed into said spray dryer, whereby a solid crystal product principally containing magnesium chloride is formed, and a combustion effluent gas stream formed by the combustion of a fluid hydrocarbon fuel with air is passed into said spray dryer at a temperature in the range of 200° C. to 500° C.

References Cited

UNITED STATES PATENTS

| | | | |
|---|---|---|---|
| 3,567,378 | 3/1971 | Ferris | 423—159 |
| 3,211,538 | 10/1965 | Gross | 159—13 C |
| 3,275,062 | 9/1966 | Williams | 159—4 A |
| 3,676,077 | 7/1972 | Bell | 23—304 |
| 3,595,297 | 7/1971 | Berg | 159—13 A |
| 3,212,235 | 10/1965 | Markant | 159—13 C |

NORMAN YUDKOFF, Primary Examiner

H. H. BERNSTEIN, Assistant Examiner

U.S. Cl. X.R.

23—296; 159—13, 45